United States Patent
Hoye et al.

(10) Patent No.: US 9,650,051 B2
(45) Date of Patent: May 16, 2017

(54) AUTONOMOUS DRIVING COMPARISON AND EVALUATION

(71) Applicant: Lytx, Inc., San Diego, CA (US)

(72) Inventors: Brett Hoye, San Marcos, CA (US); Daniel Lambert, Carlsbad, CA (US); Greg Sutton, Del Mar, CA (US)

(73) Assignee: Lytx, Inc., San Diego, CA (US)

( * ) Notice: Subject to any disclaimer, the term of this patent is extended or adjusted under 35 U.S.C. 154(b) by 205 days.

(21) Appl. No.: 14/138,081

(22) Filed: Dec. 22, 2013

(65) Prior Publication Data

US 2015/0175168 A1 Jun. 25, 2015

(51) Int. Cl.
*G09B 9/04* (2006.01)
*B60W 40/08* (2012.01)
*G09B 9/052* (2006.01)
*G09B 9/042* (2006.01)

(52) U.S. Cl.
CPC ............. *B60W 40/08* (2013.01); *G09B 9/042* (2013.01); *G09B 9/052* (2013.01)

(58) Field of Classification Search
CPC ....... G09B 9/052; G09B 9/042; B60W 40/09; G07C 5/0841
See application file for complete search history.

(56) References Cited

U.S. PATENT DOCUMENTS

| | | | |
|---|---|---|---|
| 7,424,414 B2 | 9/2008 | Craft | |
| 2005/0090938 A1* | 4/2005 | Ranelli | G05D 1/0278 701/1 |
| 2009/0234552 A1 | 9/2009 | Takeda et al. | |
| 2009/0287367 A1* | 11/2009 | Salinger | G05D 1/0246 701/23 |
| 2010/0178637 A1* | 7/2010 | Lecointre | B60R 16/0236 434/29 |
| 2010/0209892 A1* | 8/2010 | Lin | G09B 19/167 434/71 |
| 2010/0318267 A1* | 12/2010 | Murata | F16H 61/0213 701/52 |
| 2012/0296559 A1* | 11/2012 | Gueziec | G08G 1/0112 701/117 |
| 2013/0189649 A1* | 7/2013 | Mannino | G09B 9/052 434/65 |
| 2013/0253782 A1 | 9/2013 | Saltsman et al. | |

OTHER PUBLICATIONS

Scott et al. "The role of a Driving Simulator in DriverTraining to Improve Fuel Economy," Driving Simulation Conference 2012 Paris, France, Sep. 6-7, 2012, pp. 1-7, [Retrieved on Jan. 27, 2015], Retrieved from the Internet: <URL: http://www.forum8.com/uploads/AMAP%20The%20role%20of%20the%20driving%20simulator%20in%20driver%20training%20%20fuel%20economy.pdf> entire document.

* cited by examiner

*Primary Examiner* — Peter Egloff
(74) *Attorney, Agent, or Firm* — Van Pelt, Yi & James LLP (57) ABSTRACT

A system for autonomous driving comparison and evaluation comprises an input interface and a processor. The input interface is configured to receive trip information generated during a driver controlled trip and receive information from an autonomous driving system related to actions that the autonomous driving system would have taken had it been in control during the trip. The processor is configured to compare a trip factor of the driver controlled trip with a simulated trip factor that would have occurred had the autonomous driving system been in control.

21 Claims, 5 Drawing Sheets

AUTONOMOUS DRIVING COMPARISON AND EVALUATION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is recorded and transmitted to a vehicle data server for later review by a human reviewer. A driver score can be determined using the reviewed events (e.g., events determined to be caused by poor driving reduce the score for the driver). However, for the case of scoring driver performance to a simulated optimal driver model, data visibility is required at a granularity beyond the exception based video review.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Autonomous driving comparison and evaluation is disclosed. A system for autonomous driving comparison and evaluation comprises an input interface configured to receive trip information generated during a driver controlled trip and receive information from an autonomous driving system related to actions that the autonomous driving system would have taken had it been in control during the trip; and a processor configured to compare a trip factor of the driver controlled trip with a simulated trip factor that would have occurred had the autonomous driving system been in control. The system for autonomous driving comparison and evaluation additionally comprises a memory coupled to the processor and configured to provide the processor with instructions.

In some embodiments, a vehicle event recorder mounted on a vehicle records vehicle data and anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. The vehicle event recorder analyzes data from sensors (e.g., video recorders, audio recorders, accelerometers, gyroscopes, vehicle state sensors, GPS, radar, ADAS, etc.) to determine when an anomalous event has occurred. The vehicle event recorder transmits event data, including sensor data, to a vehicle data server, where the data is stored and analyzed. The vehicle event recorder additionally comprises a simulated driver assistance system. The simulated driver assistance system is designed to simulate driver assistance and autonomous control systems as a baseline of autonomous driving performance based on data received from the installed driver assistance and autonomous control sensors and systems installed in the vehicle. In various embodiments, the installed driver assistance system inputs are comprised of electronic stability control, braking assistance, adaptive cruise control, automatic lane following, automatic steering and navigation, full automated driving, or any other appropriate driver assistance system. In some embodiments, the installed driver assistance system comprises an autonomous driver assistance system. In some embodiments, the installed driver assistance system comprises a set of Advanced Driver Assistance Systems (ADAS). During normal vehicle operation, the vehicle driver controls the vehicle, and signals from the installed driver assistance system may or may not be ignored by the driving subsystems of the vehicle depending on the driver enabling or disabling these systems. Regardless of the installed driver assistance systems outputs being utilized by the driving subsystems of the vehicle, signals from the installed driver assistance systems are processed by vehicle event recorder simulated driver assistance system and the signals are used as a reference against which the driver's actions can be compared. A driver score for the trip can be determined based on the comparison of the driver actions with the simulated driver assistance system actions. In some embodiments, any deviation of the driver's actions from the signals of the driver assistance system causes a reduction of driver score.

In some embodiments, a trip factor (e.g., travel time, fuel economy, trip safety, etc.) is determined for the trip and compared with a simulated trip factor for the trip indicated by the signals of the simulated driver assistance system. The trip score is determined based on the ratio of the trip factor and the simulated trip factor. The driver score is computed as an aggregate of trip scores—for example, an average or a weighted average of trip scores over many trips. In various embodiments, the weighted average includes weighting to decay the contributions with time (e.g., more recent trips are weighted more than older trips, for example the last week, is weighted more than the previous week and much more than last month or 6 months ago), weighting to emphasize longer trips, shorter trips, trips during certain periods of the day (e.g., working hour trips vs. non-working hour trips, etc.), weighting to emphasize customer priority (e.g., based on riskiness—for example, statistically riskier such as due to bad weather, heavy traffic, higher number of ADAS warnings, based on fuel efficiency, etc.), or any other appropriate weighting.

In some embodiments, a driver is benchmarked against the installed driver assistance systems (e.g., lane keep system and following distance system). In some embodiments, the driver is benchmarked against a simulated driver assistance systems based on data provided by the installed driver assistance components and sensors (e.g., simulate a lane keep system based on lane detection and tracking (LDAT) data from a lane departure warning (LDW) system).

Figure 1:
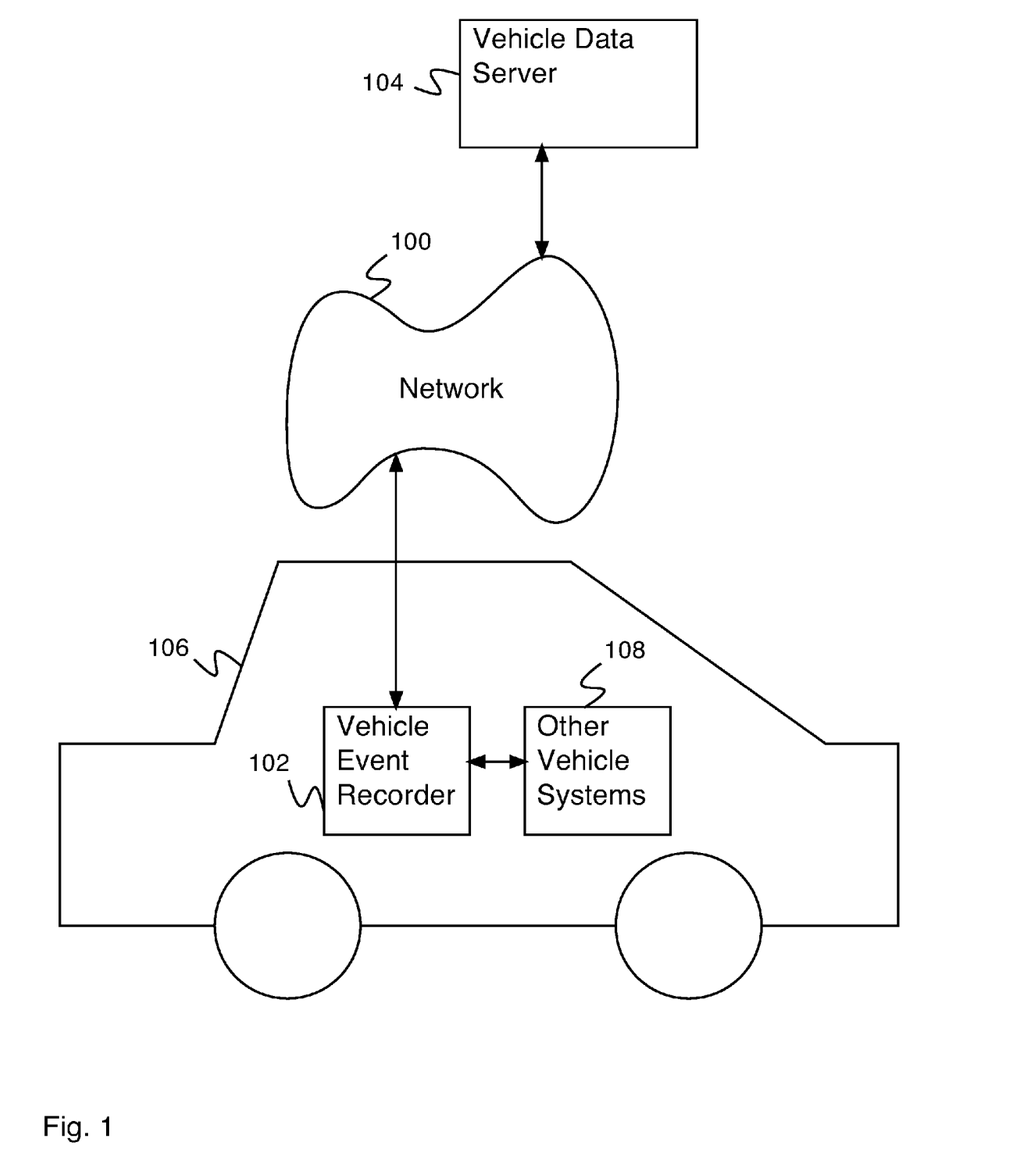
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in vehicle 106 (e.g., a car or truck). In some embodiments, vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, radar, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Accessing (CDMA) network, a Global System for Mobile (GSM) communications network, Wideband Code Division Multiple Access (W-CDMA), Long Term Evolution (LTE), a local area network, a wide area network, the Internet, or any other appropriate network. In some embodiments, network 100 comprises multiple networks, changing over time and location. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly (e.g., the home station case is wired, private wireless—for example, WiFi, etc.). In some embodiments, network 100 comprises a public generally available network (e.g., a WiFi, a cellular network, or satellite network). In some embodiments, a subset of events recorded by vehicle event recorder 102 is downloaded to vehicle data server 104 wirelessly. Vehicle 106 additionally comprises other vehicle systems 108 in communication with vehicle event recorder 102 (e.g., sensor systems, user interface systems, driving subsystems, driver assistance systems, etc.).

Figure 2:
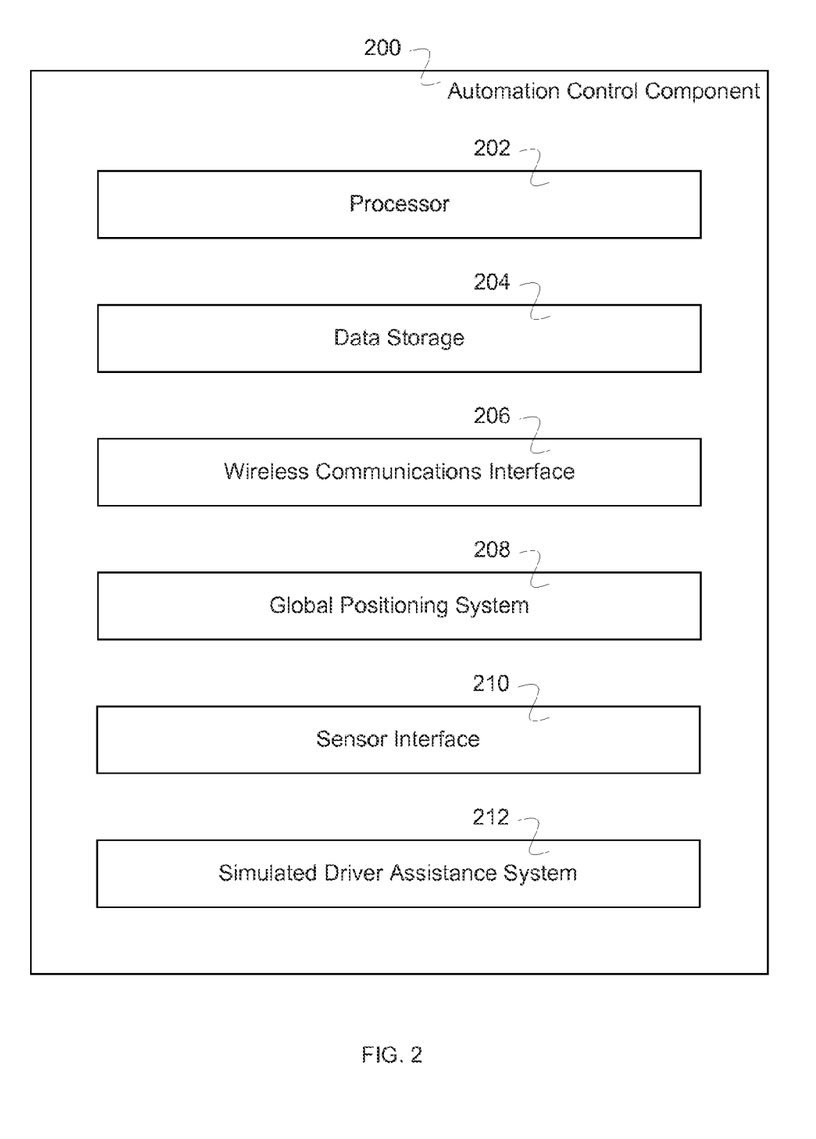
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, or any other appropriate data. In various embodiments, wireless communications interface 206 comprises one or more of a Global System for Mobile (GSM) interface, a Code Division Multiple Accessing (CDMA) interface, a Wideband Code Division Multiple Access (WCDMA) interface, a Long Term Evolution (LTE) interface, a WiFi interface, or any other appropriate interface. Global positioning system 208 comprises a global positioning system (e.g., GPS) for determining a system location. Sensor interface 210 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, ADAS, interface to front radar, back and side radar or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In various embodiments, sensor interface 210 comprises an on-board diagnostics (OBD) bus (e.g., society of automotive engineers (SAE) J1939, J1708/J1587, On-Board Diagnostics (OBD)-II, controller area network (CAN) BUS, etc.), interface to a powertrain control module (e.g., a PCM), or any other appropriate interface. In some embodiments, vehicle event recorder 200 communicates with vehicle state sensors via OBD bus. Simulated driver assistance system 212 is designed to simulate driver assistance and autonomous control systems as a baseline of autonomous driving performance based on data received from the installed driver assistance and autonomous control sensors and systems installed in the vehicle. Driver performance is measured in comparison to the baseline. In various embodiments, driver assistance systems comprise one or more of the following: a lane keeping system, a following distance system, or any other appropriate driver assistance system.

Figure 3:
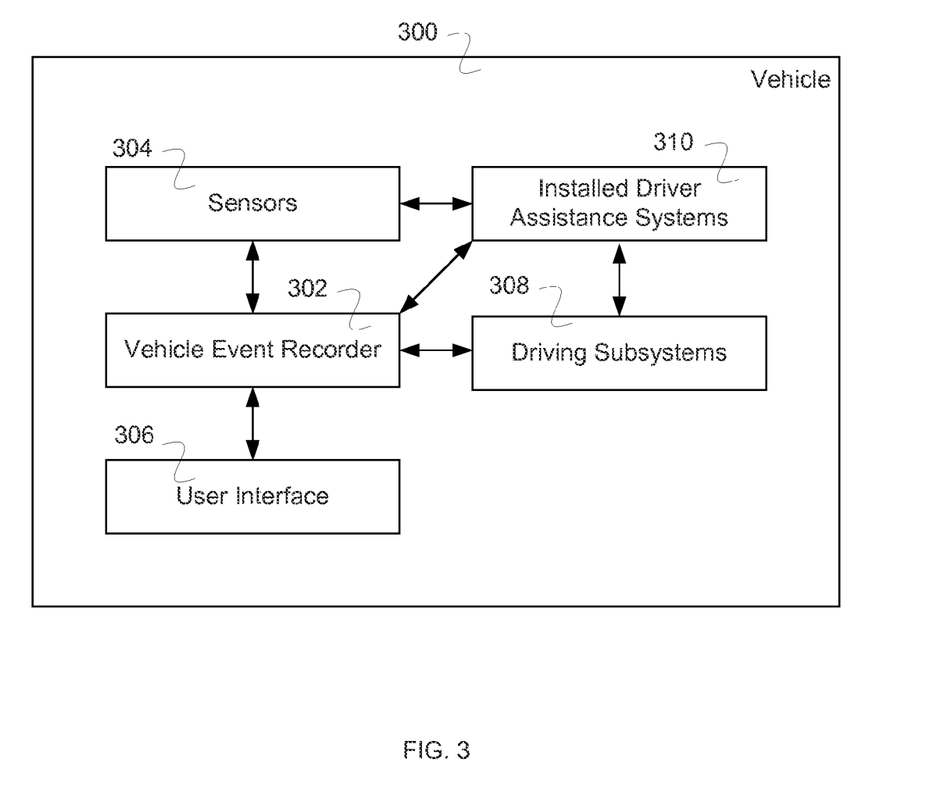
FIG. 3 is a block diagram illustrating an embodiment of subsystems of a vehicle.

FIG. 3 is a block diagram illustrating an embodiment of subsystems of a vehicle. In some embodiments, vehicle 300 comprises vehicle 106 of FIG. 1. In the example shown, vehicle 300 comprises vehicle event recorder 302. In some embodiments, vehicle event recorder 302 comprises vehicle event recorder 200 of FIG. 2. Vehicle event recorder 302 receives sensor data from sensors 304. In various embodiments, vehicle event recorder 302 processes sensor data to determine occurrence of anomalous events, to determine when installed driver assistance systems 310 should be activated, to determine when video data should be recorded/stored, to evaluate the risk associated with the data, or for any other appropriate reason. In various embodiments, the risk indicates distracted driving, drowsy driving, intoxicated driving, aggressive driving, a legal infraction, icy roads, poor visibility, rain, failing brakes, a damaged tire, or any other appropriate risky situation. In some embodiments, vehicle event recorder 302 includes driver assistance algorithms to simulate equivalent performance to a vehicle being controlled using installed driver assistance systems 310. Sensor data from sensors 304 are passed to installed driver assistance systems 310 for processing. Installed driver assistance systems 310 process sensor data to determine driving subsystems control information. Installed driver assistance systems 310 provides driving subsystems control information to driving subsystems 308 to control the driving elements of the vehicle. Installed driver assistance systems 310 comprise one or more systems for automatically assisting the driver. In various embodiments, installed driver assistance systems 310 comprise electronic stability control, braking assistance, adaptive cruise control, automatic lane following, automatic steering and navigation, full automated driving, or any other appropriate driver assistance systems. In some embodiments, installed driver assistance systems 310 comprise autonomous driver assistance systems. In some embodiments, installed driver assistance systems 310 comprise a set of Advanced Driver Assistance Systems (ADAS). In some embodiments, installed driver assistance systems 310 provide driving subsystems control information to vehicle event recorder 302 for processing.

Driving subsystems 308 comprise subsystems controlling the various driving elements of the vehicle (e.g., acceleration, brakes, steering, etc.). In some embodiments, driving subsystems 308 receive commands from the vehicle controls (e.g., accelerator pedal, brake pedal, steering wheel, etc.) and provide commands to the driving elements of the vehicle to operate the vehicle as indicated by the driver. In some embodiments, driving subsystems 308 provides vehicle control commands received from the driving elements of the vehicle to vehicle event recorder 302 for processing. In some embodiments, vehicle event recorder uses driving subsystems control information received from installed driver assistance systems 310 and vehicle control commands received from driving subsystems 308 to compute a trip score. In some embodiments, when a trip is complete and a trip score has been computed, the trip score is displayed to the user via user interface 306. In various embodiments, a trip score is calculated on vehicle event recorder 302 or a vehicle data server based at least in part on data collected by vehicle event recorder 302, any applicable backend data contextual data (e.g., traffic details, weather data, etc.), or any other appropriate data. In some embodiments, if vehicle event recorder 302 detects a large or significant difference between the driving subsystems control information and the vehicle control commands, it determines that an anomalous event has occurred. In some embodiments, the anomalous event is stored. In some embodiments, the anomalous event is transmitted to a vehicle data server for later review.

Figure 4:
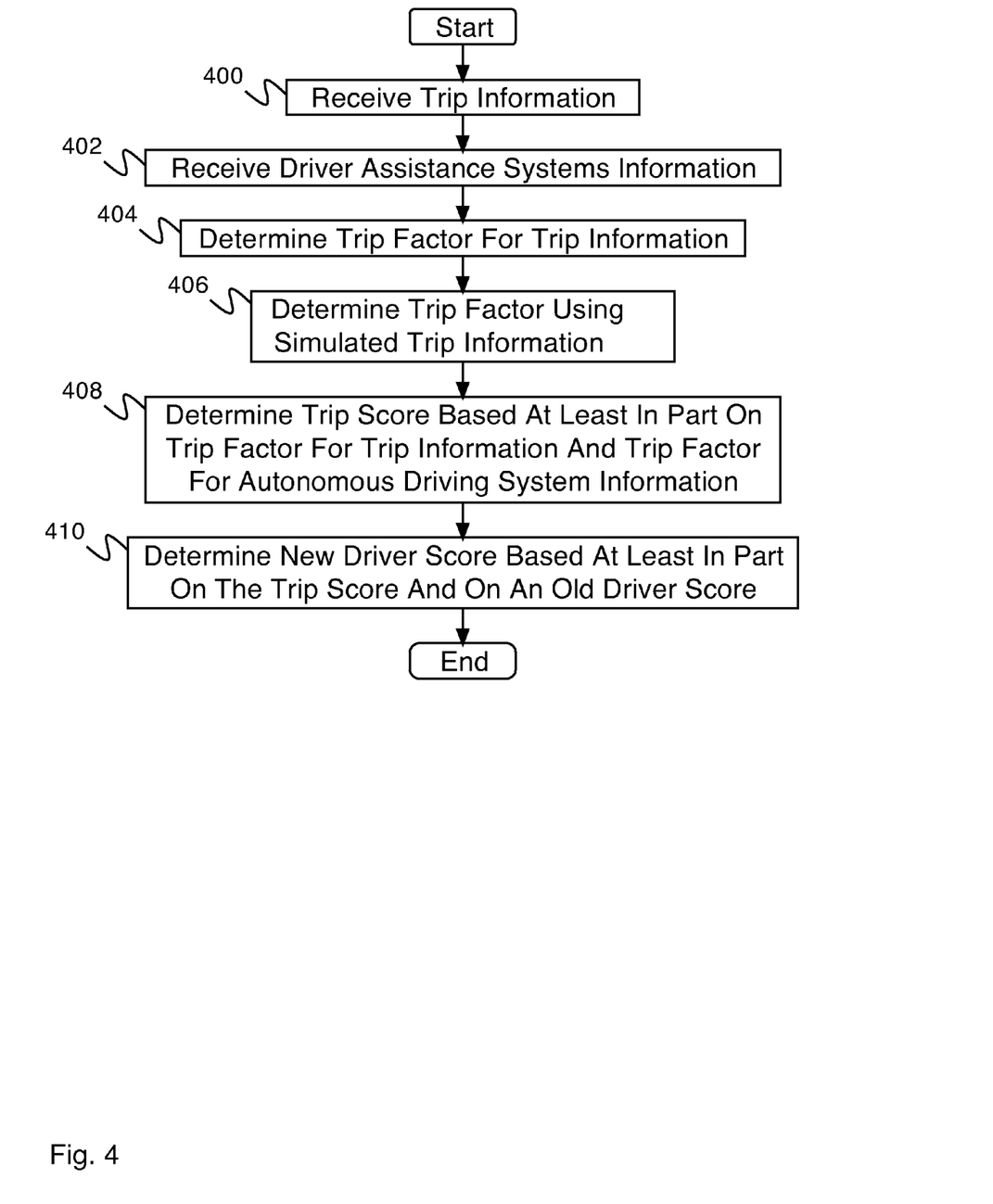
FIG. 4 is a flow diagram illustrating an embodiment of a process for autonomous driving comparison and evaluation.

FIG. 4 is a flow diagram illustrating an embodiment of a process for autonomous driving comparison and evaluation. In some embodiments, the process of FIG. 4 is used by vehicle event recorder 302 of FIG. 3 to compute a trip score and a driver score. In the example shown, in 400, trip information is received. In some embodiments, trip information comprises vehicle control commands (e.g., vehicle control commands received from driving subsystems). In 402, driver assistance systems information is received. In some embodiments, driver assistance systems information comprises driving subsystems control information received from driver assistance systems. In 404, a trip factor for the trip information (e.g., the trip information received in 400) is determined. In various embodiments, a trip factor comprises trip time, trip fuel consumption, trip safety, human fatigue factors (e.g., hours of service (HOS) regulations), or any other appropriate trip factor. In some embodiments, determining trip safety comprises determining the safety of the trip route, determining the safety of the trip speed, determining the safety of the driving style (e.g., tailgating, hard acceleration, hard cornering, hard braking, following too close, not following the lane, etc.), determining safety violations (e.g., eating while driving, cell phone usage, etc.), determining if autonomous driving should have been engaged (e.g., prior to making a phone call), or determining any other appropriate trip safety information. In 406, a trip factor is determined using simulated trip information. For example, the simulated trip information is determined based on the driver assistance systems information received indicating different driving from the actual driving and using this information to simulate the trip information. In various embodiments, determining a trip factor comprises determining a route indicated by the driver assistance systems, determining an average speed indicated by the driver assistance systems, determining a relationship between fuel consumption and speed, determining a route safety, or determining any other appropriate trip factor information. In 408, a trip score based at least in part on the trip factor for the trip information and the trip factor for the autonomous driving system information is determined. In some embodiments, the trip score comprises the ratio of the trip factor for the trip information and the trip factor for the autonomous driving system information. In 410, a new driver score is determined based at least in part on the trip score and on an old driver score. In some embodiments, the new driver score comprises an average of trip scores. In some embodiments, the new driver score comprises a weighted average of trip scores.

In various embodiments, trip factors comprise safety factors, efficiency factors, and compliance factors. In comparison, regulatory compliance comprises safety factors and efficiency factors. In various embodiments, speed limit is relevant to safety and fuel efficiency, HOS is relevant to efficiency, fatigue is relevant to safety factors, or any other appropriate factors.

Figure 5:
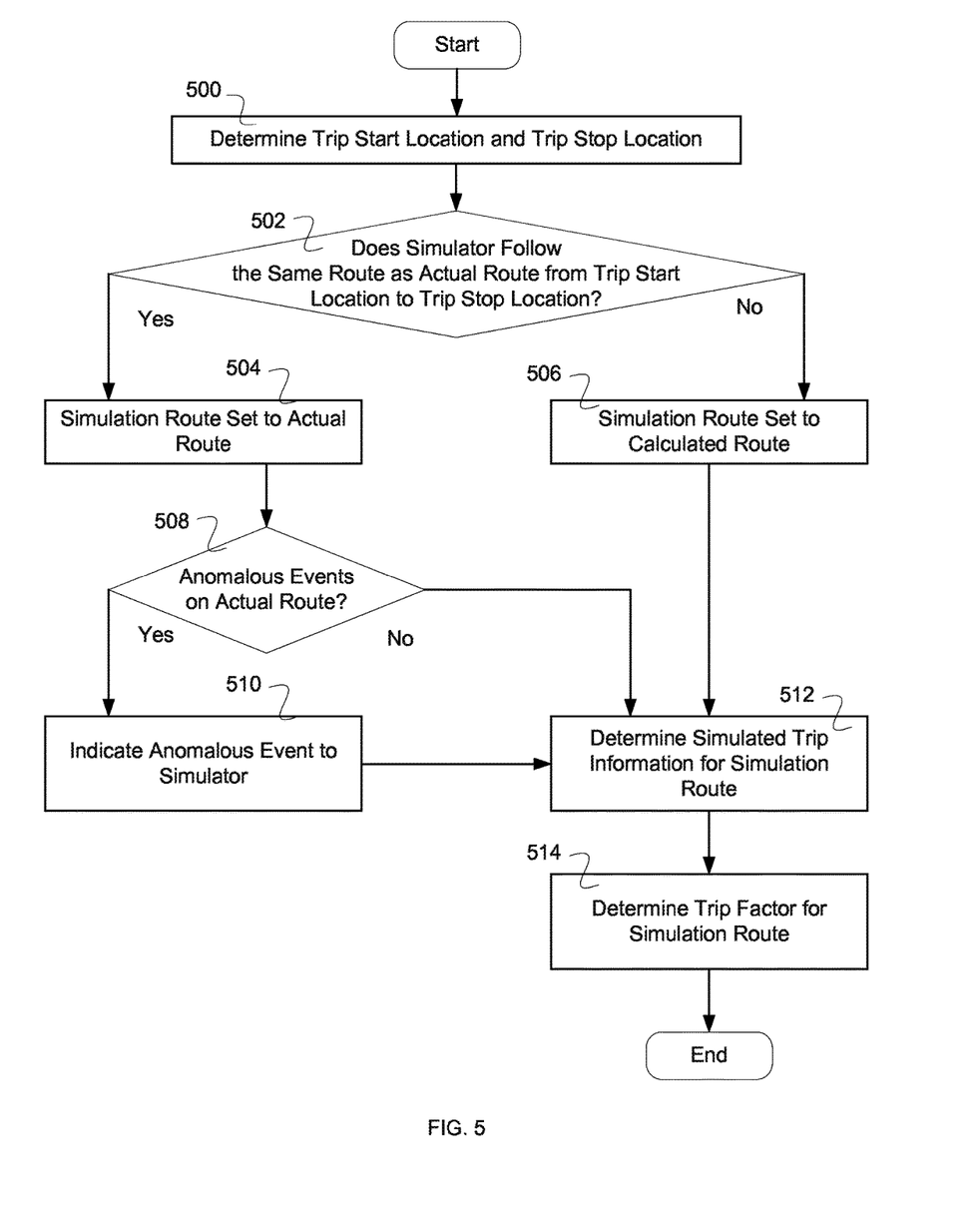
FIG. 5 is a flow diagram illustrating an embodiment of a process for determining a trip factor for a simulation route.

FIG. 5 is a flow diagram illustrating an embodiment of a process for determining a trip factor for a simulation route. In some embodiments, the process of FIG. 5 is used to implement 406 of FIG. 4. In the example shown, in 500 a trip start location and a trip stop location is determined. In 502, it is determined whether the simulator follows the same route as the actual route from trip start location to trip stop location. For example, a routing algorithm calculates or determines a route from the trip start location to the trip stop location. The route is checked against the actual trip route. In the event that the route is not the same as the actual route, in 506 the simulation route is set to calculated route, and control passes to 512. In the event that the route is the same as the actual route, then in 504, the simulation route is set to be the actual route. In 508, it is determined whether any anomalous events occurred on the actual route. For example, an anomalous event determination might come from driver assistance system information. In various embodiments, anomalous events include one or more of the following: weather, accidents, construction, traffic, an event that the driver had to contend with (e.g., a pedestrian, a cyclist, a near collision, etc.). In some embodiments, a subset of anomalous events (e.g., route context) is factored into the simulated route if the data is available real time (e.g., route selection based on real time traffic data). In the event that no anomalous events occurred on the actual route, control passes to 512. In the event that anomalous events occurred on the actual route, in 510 it is indicated that anomalous events occurred to the simulator, and control passes to 512. In 512, simulated trip information is determined for the simulation route. For example, the simulated trip information is determined using an automated driver system driving the simulation route and including any indicated anomalous events. In 514, a trip factor is determined for the simulation route. For example, a trip factor (e.g., driver safety, fuel efficiency, time efficiency, etc.) are determined for the simulation route.

In some embodiments, simulated trip information is determined for the actual route only, and no determination is made whether other routes could/should have been taken. In some embodiments, no account is taken of anomalous events along the actual route, and the simulation of trip event assumes normal driving conditions.

In some embodiments, the system for driving comparison and evaluation allows for an actual driver to be compared to or evaluated against an autonomous driver. The driver score is compared to a performance of an autonomous driver's simulated performance when following the same route from A to B, a different route from A to B, the same route from A to B including driving circumstances (e.g., events, traffic, weather, etc.), or any other different levels of included factors. In some embodiments, the processor is configured to detect a deviation between the driver controlled trip and the trip that would have occurred had the autonomous driving system been in control. In some embodiments, the driver score is provided using an output interface to a user of the system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for scoring a trip made by a vehicle, comprising:
    an input interface configured to:
        receive trip information generated during the trip, wherein a driver operates the vehicle during the trip; and
        receive sensor data associated with the trip; and
    a processor configured to:
        determine an actual trip factor based at least in part on the trip information, wherein the actual trip factor is based on at least one of fuel economy and a trip safety rating;
        determine a simulation characteristic in response to the received sensor data, wherein the simulation characteristic includes a control signal to control vehicle subsystems in response to characteristics of the trip, the control signal being equivalent to an output generated by a driver assistance system in response to the characteristics of the trip;
        determine a simulated trip factor based at least in part on the determined simulation characteristic, wherein the simulation characteristic includes at least one of: simulated fuel economy and a simulated trip safety rating;
        determine a trip score based at least in part on a ratio of the actual trip factor to the simulated trip factor;
        output the trip score;
        determine whether there are any anomalous events on the actual route based on a comparison between the control signal and the trip information; and
        activate a driver assistance system in response to the determination that at least one anomalous event has occurred.

2. The system of claim 1, wherein the processor is further configured to
    determine a driver score based at least in part on the trip score.

3. The system of claim 2, wherein the driver score is based at least in part on an old driver score.

4. The system of claim 1, wherein the trip factor comprises a travel time.

5. The system of claim 1, wherein the trip factor comprises a fuel consumption.

6. The system of claim 1, wherein the trip factor comprises a trip safety.

7. The system of claim 1, wherein the processor is further configured to detect a deviation between the driver controlled trip and the trip that would have occurred had the driver assistance system been in control.

8. The system of claim 1, further comprising an output interface configured to provide a driver score.

9. The system as in claim 1, wherein the determination of the simulation characteristic includes determining a trip start location and a trip stop location.

10. The system as in claim 1, wherein the determination of the simulation characteristic includes determining whether the simulator follows a same route as an actual route.

11. The system as in claim 10, wherein the determination of the simulation characteristic includes, in the event that the simulator follows the same route as the actual route, setting a simulation route to the actual route.

12. The system as in claim 10, wherein the determination of the simulation characteristic includes, in the event that the simulator does not follow the same route as the actual route, setting a simulation route to a calculated route.

13. The system as in claim 1, wherein in the event that there is/are anomalous event(s) on the actual route, indicating that there is/are anomalous event(s) to the driver assistance system.

14. The system as in claim 1, wherein in the event that there are not any anomalous events on the actual route, determining simulated trip information for simulation route.

15. The system as in claim 1, wherein the received sensor data associated with the trip comprises sensor information that is processed using a simulated driver assistance system.

16. The system as in claim 1, wherein the received sensor data associated with the trip comprises installed driver assistance system information that is processed using a simulated driver assistance system.

17. A method for scoring a trip made by a vehicle, comprising:
receiving trip information generated during the trip, wherein a driver operates the vehicle during the trip;
determining an actual trip factor based at least in part on the trip information, wherein the actual trip factor is based on at least one of fuel economy and a trip safety rating; and
receiving sensor data associated with the trip
determining a simulation characteristic in response to the received sensor data, wherein the simulation characteristic includes a control signal to control vehicle subsystems in response to characteristics of the trip, the control signal being equivalent to an output generated by a driver assistance system in response to the characteristics of the trip;
determining a simulated trip factor based at least in part on the determined simulation characteristic, wherein the simulation characteristic includes at least one of: simulated fuel economy and a simulated trip safety rating;
determining a trip score based at least in part on a ratio of the actual trip factor to the simulated trip factor;
outputting the trip score;
determining whether there are any anomalous events on the actual route based on a comparison between the control signal and the trip information; and
activating a driver assistance system in response to the determination that at least one anomalous event has occurred.

18. A computer program product for autonomous driving comparison and evaluation of a vehicle, the computer program product being embodied in a non-transitory computer readable storage medium and comprising computer instructions for:
receiving trip information generated during the trip, wherein a driver operates the vehicle during the trip;
determining an actual trip factor based at least in part on the trip information, wherein the actual trip factor is based on at least one of fuel economy and a trip safety rating; and
receiving sensor data associated with the trip;
determining a simulation characteristic in response to the received sensor data, wherein the simulation characteristic includes a control signal to control vehicle subsystems in response to characteristics of the trip, the control signal being equivalent to an output generated by a driver assistance system in response to the characteristics of the trip;
determining a simulated trip factor based at least in part on the determined simulation characteristic, wherein the simulation characteristic includes at least one of: simulated fuel economy and a simulated trip safety rating;
determining a trip score based at least in part on a ratio of the actual trip factor to the simulated trip factor;
outputting the trip score;
determining whether there are any anomalous events on the actual route based on a comparison between the control signal and the trip information; and
activating a driver assistance system in response to the determination that at least one anomalous event has occurred.

19. The method of claim 17, wherein the driver assistance system controls a vehicle such that the vehicle is autonomous.

20. The system of claim 7, further comprising decreasing a driver score responsive to a determination that the deviation is above a threshold, wherein a decreased driver score indicates poorer driving compared with a higher driver score.

21. The method of claim 17, wherein the actual trip factor includes a trip safety rating, the trip safety rating being calculated from at least one of: a safety of a route during the trip, a speed of the vehicle during the trip, a driving style during the trip, and one or more violations made during the trip.

* * * * *